(12) United States Patent
Bond et al.

(10) Patent No.: US 12,272,150 B2
(45) Date of Patent: Apr. 8, 2025

(54) IDENTIFICATION OF OBJECTS BY COLOR WITH ARHUD

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US); Kai-Han Chang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 17/818,165

(22) Filed: Aug. 8, 2022

(65) Prior Publication Data

US 2024/0042954 A1   Feb. 8, 2024

(51) Int. Cl.
| | |
|---|---|
| *G06V 20/56* | (2022.01) |
| *B60R 1/20* | (2022.01) |
| *B60R 16/037* | (2006.01) |
| *G06V 20/20* | (2022.01) |
| *G06V 20/70* | (2022.01) |

(52) U.S. Cl.
CPC ............... *G06V 20/56* (2022.01); *B60R 1/20* (2022.01); *B60R 16/0373* (2013.01); *G06V 20/70* (2022.01); *B60R 2300/105* (2013.01); *G06V 20/20* (2022.01)

(58) Field of Classification Search
CPC ........ G06V 20/56; G06V 20/70; G06V 20/20; B60R 1/20; B60R 16/0373; B60R 2300/105
See application file for complete search history.

(56) References Cited

U.S. PATENT DOCUMENTS

| | | | | |
|---|---|---|---|---|
| 2017/0187963 | A1* | 6/2017 | Lee | G01C 21/365 |
| 2022/0358315 | A1* | 11/2022 | Qiu | G06V 20/56 |
| 2023/0017247 | A1* | 1/2023 | Hwang | G01S 19/24 |

FOREIGN PATENT DOCUMENTS

JP         2021081372 A   *   5/2021

\* cited by examiner

*Primary Examiner* — Thomas E Worden
*Assistant Examiner* — Christopher Scott
(74) *Attorney, Agent, or Firm* — Vivacqua Crane, PLLC

(57) ABSTRACT

A system for displaying information to an occupant of a vehicle includes a microphone, a camera for capturing images of an environment surrounding the vehicle, a display, and a controller in electrical communication with the microphone, the camera, and the display. The controller is programmed to receive a voice command from the occupant using the microphone, determine at least one characteristic of the requested object based on the voice command, capture an image of the environment using the camera, where the environment includes a relevant object, and to identify a location of the relevant object in the environment based at least in part on the image and the at least one characteristic of the requested object. The controller is further programmed to display a graphic based at least in part on the location of the relevant object in the environment using the display.

20 Claims, 6 Drawing Sheets

IDENTIFICATION OF OBJECTS BY COLOR WITH ARHUD

INTRODUCTION

The present disclosure relates to an augmented reality head-up display for displaying information to an occupant of a vehicle.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the occupant's forward field of view. Accordingly, the head-up display provides occupants with information without looking away from the road. One possible implementation for augmented reality is an augmented reality head-up display (AR-HUD) for a vehicle. By overlaying images on the windscreen, AR-HUDs enhance an occupant's view of the environment outside the vehicle, creating a greater sense of environmental awareness. Enhanced environmental awareness may be especially important for occupants having a disability such as, for example, color-vision impairment.

Therefore, while current augmented reality head-up displays achieve their intended purpose, there is a need in the art for an improved approach for providing information to vehicle occupants.

SUMMARY

According to several aspects, a system for displaying information to an occupant of a vehicle is provided. The system includes a microphone for converting acoustic waves to electrical signals, a camera for capturing images of an environment surrounding the vehicle, a display for displaying information to the occupant, and a controller in electrical communication with the microphone, the camera, and the display. The controller is programmed to receive a voice command from the occupant using the microphone, where the voice command includes at least one characteristic of a requested object. The controller is further programmed to determine the at least one characteristic of the requested object based on the voice command. The controller is further programmed to capture an image of the environment using the camera, where the environment includes a relevant object. The controller is further programmed to identify a location of the relevant object in the environment based at least in part on the image and the at least one characteristic of the requested object. The controller is further programmed to display a graphic based at least in part on the location of the relevant object in the environment using the display.

In another aspect of the present disclosure, to receive the voice command from the occupant using the microphone, the controller is further programmed to receive a plurality of electrical signals corresponding to acoustic waves detected by the microphone and identify a phrase spoken by the occupant using the plurality of electrical signals and a speech recognition algorithm.

In another aspect of the present disclosure, to determine at least one characteristic of the requested object, the controller is further programmed to determine an identity of the requested object and a color of the requested object by analyzing the phrase spoken by the occupant.

In another aspect of the present disclosure, to identify the location of a relevant object in the environment, the controller is further programmed to analyze the image of the environment to locate the relevant object, where an identity of the relevant object is substantially similar to the identity of the requested object, and a color of the relevant object is substantially similar to the color of the requested object.

In another aspect of the present disclosure, to analyze the image of the environment to locate the relevant object, the controller is further programmed to determine an identity and a location for each of a plurality of detected objects in the image using an object detection algorithm. To analyze the image of the environment to locate the relevant object, the controller is further programmed to determine a color for each of the plurality of detected objects in the image using an image segmentation algorithm. To analyze the image of the environment to locate the relevant object, the controller is further programmed to locate the relevant object in the image based at least in part on the identity, location, and color of each of the plurality of detected objects in the image and based at least in part on the identity of the requested object and the color of the requested object.

In another aspect of the present disclosure, to locate the relevant object based at least in part on the identity, location, and color of the plurality of detected objects in the image and based at least in part on the identity of the requested object and the color of the requested object, the controller is further programmed to identify a plurality of matching objects in the image, where the plurality of matching objects is a subset of the plurality of detected objects, and where the identity of each of the plurality of matching objects is substantially similar to the identity of the requested object and the color of each of the plurality of matching objects is substantially similar to the color of the requested object. To locate the relevant object based at least in part on the identity, location, and color of the plurality of detected objects in the image and based at least in part on the identity of the requested object and the color of the requested object, the controller is further programmed to determine a distance between the vehicle and each of the plurality of matching objects. To locate the relevant object based at least in part on the identity, location, and color of the plurality of detected objects in the image and based at least in part on the identity of the requested object and the color of the requested object, the controller is further programmed to identify the relevant object as the closest of the plurality of matching objects to the vehicle based on the distance between the vehicle and each of the plurality of matching objects. To locate the relevant object based at least in part on the identity, location, and color of the plurality of detected objects in the image and based at least in part on the identity of the requested object and the color of the requested object, the controller is further programmed to locate the relevant object based on the location of each of the plurality of detected objects in the image.

In another aspect of the present disclosure, to identify the location of a relevant object in the environment, the controller is further programmed to establish a connection with a remote system using the vehicle communication system. To identify the location of a relevant object in the environment, the controller is further programmed to transmit the at least one characteristic of the requested object to the remote system using the vehicle communication system. To identify the location of a relevant object in the environment, the controller is further programmed to receive the location of the relevant object in the environment from the remote system using the vehicle communication system, where an identity of the relevant object is substantially similar to the identity of the requested object, and a color of the relevant object is substantially similar to the color of the requested object.

In another aspect of the present disclosure, the display is an augmented reality head-up display (AR-HUD) system in electronic communication with the controller, where the AR-HUD system includes an occupant position tracking device and an AR-HUD projector, and where to display the graphic the controller is further programmed to determine a position of an occupant of the vehicle using the occupant position tracking device. To display the graphic the controller is further programmed to calculate a size, shape, and location of the graphic based on the position of the occupant and the image of the environment. To display the graphic the controller is further programmed to display the graphic indicating the location of the relevant object on a windscreen of the vehicle using the AR-HUD system based on the size, shape, and location of the graphic.

In another aspect of the present disclosure, the display further includes a transparent windscreen display (TWD) system in electronic communication with the controller, where the TWD system includes transparent phosphors embedded in the windscreen of the vehicle and a TWD projector, and where to display the graphic the controller is further programmed to calculate a size, shape, and location of the graphic based on the image of the environment. To display the graphic the controller is further programmed to display the graphic indicating the location of the relevant object on the windscreen of the vehicle using the TWD system based on the size, shape, and location of the graphic.

In another aspect of the present disclosure, the graphic includes a polygon overlayed on the relevant object and text displayed proximal to the polygon, where the polygon identifies the location of the relevant object, and the text identifies the color of the relevant object.

According to several aspects, a method for displaying information about an environment surrounding a user is provided. The method includes receiving an identity and a color of a requested object from the user, capturing an image of the environment surrounding the user using a camera, and identifying a relevant object in the environment surrounding the user based on the image, the identity of the requested object, and color of the requested object. The method also includes displaying a graphic indicating a location of the relevant object in the environment surrounding the user.

In another aspect of the present disclosure, receiving the identity and the color of the requested object from the user further may include prompting the user to input the identity and the color of the requested object and receiving a user input including the identity and the color of the requested object.

In another aspect of the present disclosure, receiving the user input including the identity and the color of the requested object further may include receiving the user input using a human-machine interface (HMI).

In another aspect of the present disclosure, receiving the user input including the identity and the color of the requested object further may include receiving the user input using a microphone, where the user input is a voice of the user, and where the microphone is configured to convert acoustic waves corresponding to the voice of the user to electrical signals. Receiving the user input including the identity and the color of the requested object further may include processing the electrical signals corresponding to the voice of the user to identify a phrase spoken by the user using a speech recognition algorithm and determining the identity and the color of the requested object based on the phrase spoken by the user.

In another aspect of the present disclosure, identifying the relevant object in the environment surrounding the user further may include analyzing the image of the environment to identify a plurality of detected objects in the environment using an object detection algorithm. Identifying the relevant object in the environment surrounding the user further may include identifying at least one matching objects, where the at least one matching objects are a subset of the plurality of detected objects, and where the identity of each of the at least one matching objects is substantially similar to the identity of the requested object, and the color of each of the at least one matching objects is substantially similar to the color of the requested object. Identifying the relevant object in the environment surrounding the user further may include identifying the relevant object to be the closest of the at least one matching objects to the user.

In another aspect of the present disclosure, displaying the graphic indicating the location of the relevant object in the environment surrounding the user further may include capturing an image of the environment including the relevant object. Displaying the graphic indicating the location of the relevant object in the environment surrounding the user further may include overlaying the graphic on relevant object in the image of the environment and displaying the image of the environment including the graphic overlayed on the relevant object to the user.

In another aspect of the present disclosure, displaying the graphic indicating the location of the relevant object in the environment surrounding the user further may include displaying the graphic using an augmented reality head-up display (AR-HUD), where the graphic appears overlayed on the relevant object.

According to several aspects, a system for displaying information to a user of a vehicle is provided. The system includes a vehicle microphone for converting acoustic waves to electrical signals, a vehicle camera for capturing images of an environment surrounding the vehicle, and a vehicle display for displaying information to the user. The system also includes a vehicle communication system, a mobile device, where the mobile device includes a mobile device camera, a mobile device display, and a mobile device controller in electrical communication with the mobile device camera and the mobile device display. The system also includes a vehicle controller in electrical communication with the vehicle microphone, the vehicle camera, the vehicle display, and the vehicle communication system. The vehicle controller is programmed to receive a voice command from the user using the vehicle microphone, where the voice command includes an identity and a color of a requested object. The vehicle controller is further programmed to determine the identity and the color of the requested object based on the voice command and transmit the identity and the color of the requested object to the mobile device using the vehicle communication system. The vehicle controller is further programmed to capture a first image of the environment surrounding the vehicle using the vehicle camera, where the environment surrounding the vehicle includes a relevant object. The vehicle controller is further programmed to identify a location of the relevant object in the environment surrounding the vehicle based at least in part on the first image and the identity and the color of the requested object. The vehicle controller is further programmed to display a graphic based at least in part on the location of the relevant object in the environment surrounding the vehicle using the vehicle display.

In another aspect of the present disclosure, the mobile device controller is programmed to receive the identity and color of the requested object transmitted by the vehicle communication system, capture a second image of an environment surrounding the mobile device using the mobile device camera, where the environment surrounding the mobile device includes the relevant object, and identify the location of the relevant object in the environment surrounding the mobile device based at least in part on the second image and the identity and the color of the requested object. The mobile device controller is further programmed to display a graphic based at least in part on the location of the relevant object in the environment surrounding the mobile device using the mobile device display.

In another aspect of the present disclosure, to identify the location of the relevant object in the environment surrounding the vehicle, the vehicle controller is further programmed to determine an identity and a location for each of a plurality of detected objects in the first image using an object detection algorithm. To identify the location of the relevant object in the environment surrounding the vehicle, the vehicle controller is further programmed to determine a color for each of the plurality of detected objects in the first image using an image segmentation algorithm. To identify the location of the relevant object in the environment surrounding the vehicle, the vehicle controller is further programmed to locate the relevant object in the first image based at least in part on the identity, location, and color of each of the plurality of detected objects in the first image and based at least in part on the identity of the requested object and the color of the requested object. To identify the location of the relevant object in the environment surrounding the mobile device, the mobile device controller is further programmed to determine an identity and a location for each of a plurality of detected objects in the second image using the object detection algorithm. To identify the location of the relevant object in the environment surrounding the mobile device, the mobile device controller is further programmed to determine a color for each of the plurality of detected objects in the second image using the image segmentation algorithm. To identify the location of the relevant object in the environment surrounding the mobile device, the mobile device controller is further programmed to locate the relevant object in the second image based at least in part on the identity, location, and color of each of the plurality of detected objects in the second image and based at least in part on the identity of the requested object and the color of the requested object.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
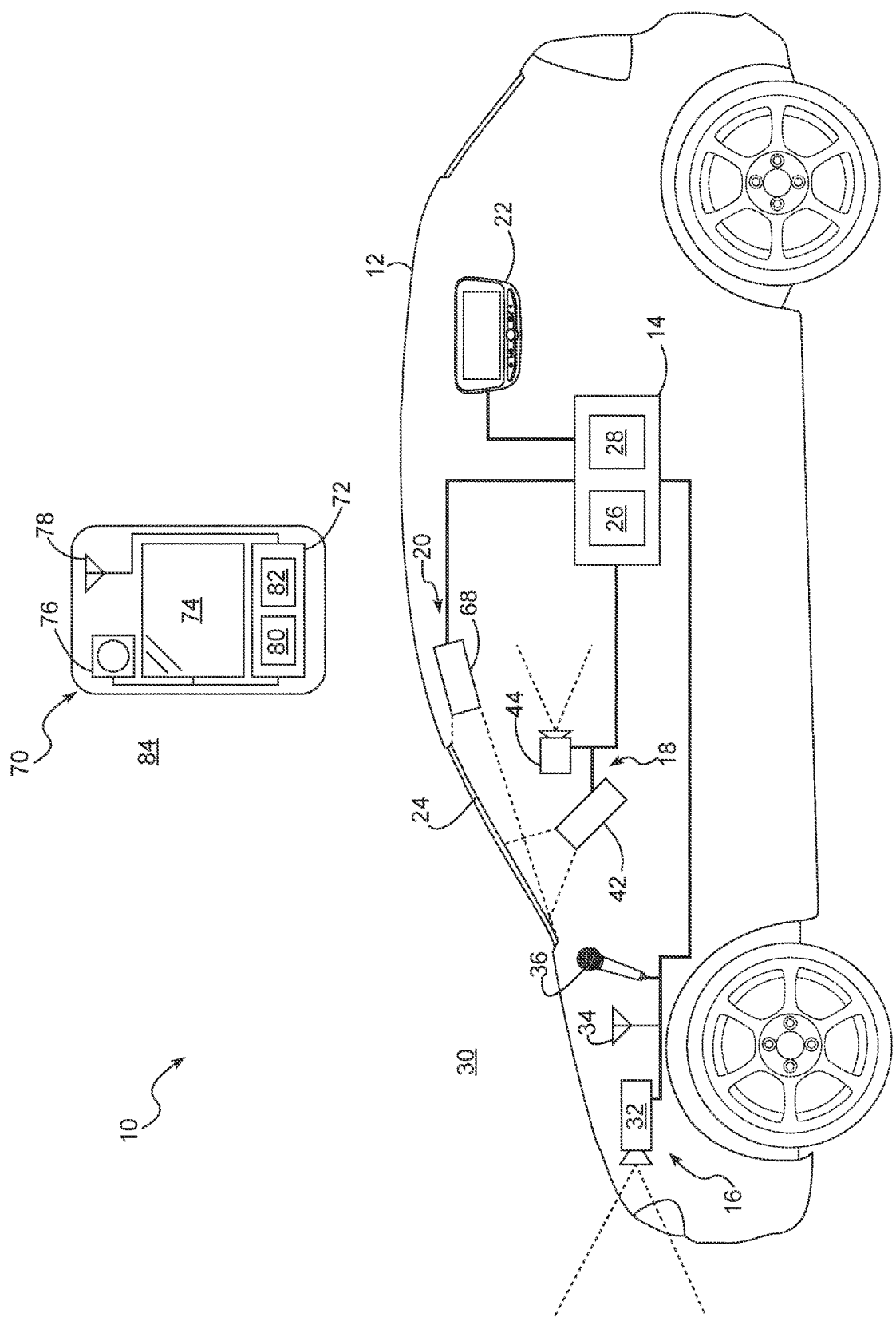
FIG. 1 is a schematic diagram of a system for displaying information to an occupant of a vehicle according to an exemplary embodiment.

Referring to FIG. 1, a system for displaying information to an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, vehicle sensors 16, an augmented reality head-up display (AR-HUD) system 18, a transparent windscreen display (TWD) system 20, and a human-machine interface (HMI) 22.

The controller 14 is used to implement a method 100 for displaying information about an environment surrounding a user, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 28 may include volatile and non-volatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the vehicle sensors 16, the AR-HUD system 18, the TWD system 20, and the HMI 22. The electrical communication may be established using, for example, a CAN bus, a Wi-Fi network, a cellular data network, or the like. It should be understood that various additional wired and wireless techniques and communication protocols for communicating with the controller 14 are within the scope of the present disclosure.

The vehicle sensors 16 are used to acquire information about a vehicle environment 30. In the present disclosure, the vehicle environment 30 refers to the environment external to the vehicle 12 surrounding the vehicle 12. For example, the vehicle environment 30 includes at least that part of the environment which is within a field-of-view of occupants of the vehicle 12. In an exemplary embodiment, the vehicle sensors 16 include a camera 32, a vehicle communication system 34, and microphone 36. It should be understood that the vehicle sensors 16 may include additional sensors for determining characteristics of the vehicle 12, for example, vehicle speed, roadway curvature, and/or vehicle steering without departing from the scope of the present disclosure. The vehicle sensors 16 are in electrical communication with the controller 14 as discussed above.

The camera 32 is used to capture images and/or videos of the vehicle environment 30 surrounding the vehicle 12. In an exemplary embodiment, the camera 32 is a photo and/or video camera which is positioned to view the vehicle environment 30 in front of the vehicle 12. In one example, the camera 32 is affixed inside of the vehicle 12, for example, in a headliner of the vehicle 12, having a view through the windscreen 24. In another example, the camera 32 is affixed outside of the vehicle 12, for example, on a roof of the vehicle 12, having a view of the vehicle environment 30 in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 34 is used by the controller 14 to communicate with other systems external to the vehicle 12. For example, the vehicle communication system 34 includes capabilities for communication with vehicles ("V2V" communication), infrastructure ("V2I" communication), remote systems at a remote call center (e.g., ON-STAR by GENERAL MOTORS) and/or personal devices. In certain embodiments, the vehicle communication system 34 is a wireless communication system configured to communicate via a wireless local area network (WLAN) using IEEE 802.11 standards or by using cellular data communication. However, additional, or alternate communication methods, such as a dedicated short-range communications (DSRC) channel and/or mobile telecommunications protocols based on the 3 rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 34 may include one or more antennas and/or communication transceivers for receiving and/or transmitting signals, such as cooperative sensing messages (CSMs). The vehicle communication system 34 is configured to wirelessly communicate information between the vehicle 12 and another vehicle. Further, the vehicle communication system 34 is configured to wirelessly communicate information between the vehicle 12 and infrastructure or other vehicles.

The microphone 36 is used to receive voice commands by converting acoustic waves into electrical signals. In an exemplary embodiment, the microphone 36 includes a uni-directional dynamic microphone (i.e., a microphone which converts acoustic waves to electrical signals using electromagnetic induction) configured to receive voice commands from a specific occupant of the vehicle 12. In another exemplary embodiment, the microphone 36 includes a plurality of microelectromechanical systems (MEMS) microphones (e.g., a microphone having a pressure-sensitive diaphragm etched directly into a silicon wafer) disposed throughout a cabin of the vehicle 12 configured to receive voice commands. It should be understood that additional types of microphones which are configured to convert acoustic waves to electrical signals (e.g., digital and/or analog electrical signals) are included in the scope of the present disclosure.

Figure 2:
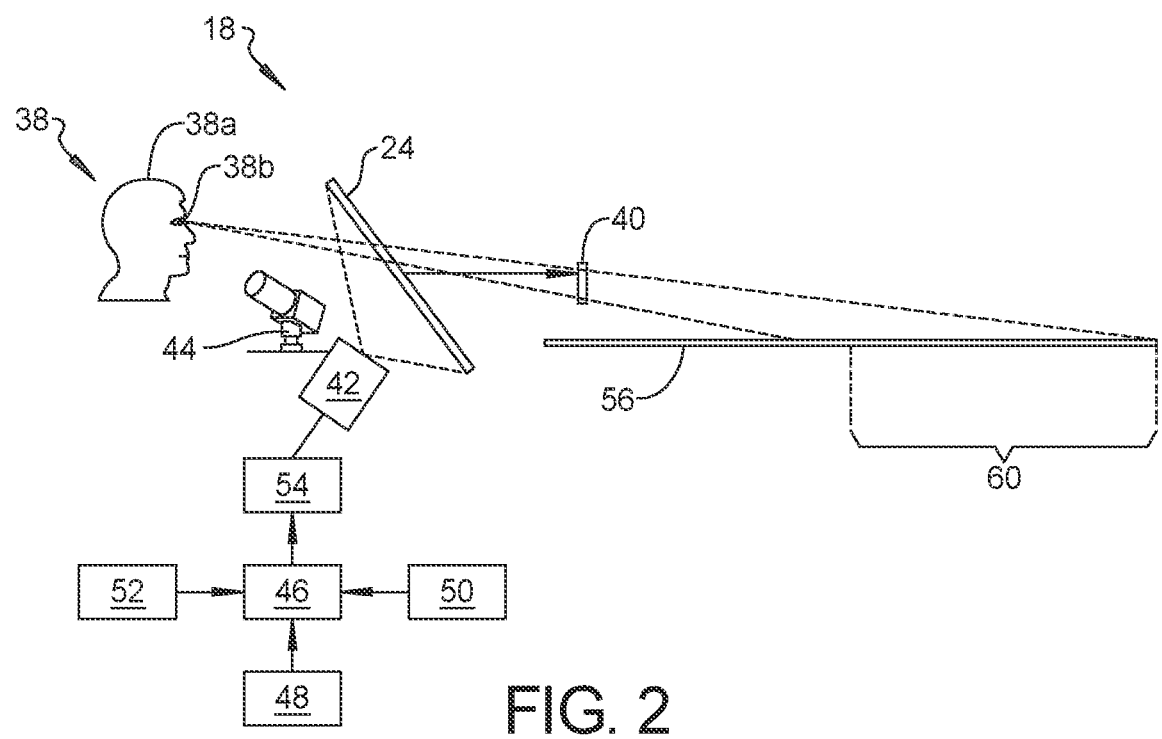
FIG. 2 is a schematic diagram of an AR-HUD system for use by an exemplary occupant according to an exemplary embodiment.

Referring to FIG. 2, a system diagram of the AR-HUD system 18 for use by an exemplary occupant 38 is shown. In the scope of the present disclosure, the occupant includes, in a non-limiting example, a driver, a passenger, and/or any additional persons in the vehicle 12. The AR-HUD system 18 is used to display AR-HUD graphics 40 (i.e., notification symbols providing visual information to the occupant 38) on the windscreen 24 of the vehicle 12. The AR-HUD system 18 includes an AR-HUD projector 42 and an occupant position tracking device 44. The AR-HUD system 18 is in electrical communication with the controller 14 as discussed above.

The AR-HUD projector 42 is used to project the AR-HUD graphics 40 on the windscreen 24 of the vehicle 12. It should be understood that various devices designed to project images including, for example, optical collimators, laser projectors, digital light projectors (DLP), and the like are within the scope of the present disclosure.

The occupant position tracking device 44 is used to determine a position of an occupant 38 in the vehicle 12. For example, the occupant position tracking device 44 may track a position of a head 38a or eyes 38b of the occupant 38. The position of the occupant 38 in the vehicle 12 from the occupant position tracking device 44 is used to locate the AR-HUD graphic 40 on a windscreen 24 of the vehicle 12. In an exemplary embodiment, the occupant position tracking device 44 is one or more cameras disposed in the vehicle 12.

To operate the AR-HUD system 18, the controller 14 includes multiple software modules, including a system manager 46. During operation of the system 10, the system manager 46 receives at least a first input 48, a second input 50, and a third input 52. The first input 48 is indicative of the location of the vehicle 12 in space (i.e., the geographical location of the vehicle 12), the second input 50 is indicative of the vehicle occupant 38 position in the vehicle 12 (e.g., the position of the eyes and/or head of the occupant 38 in the vehicle 12), and the third input 52 is data pertaining to a location of a relevant object, as will be discussed in greater detail below. The first input 48 may include data such as GNSS data (e.g., GPS data), vehicle speed, roadway curvature, and vehicle steering, and this data is collected from the vehicle sensors 16. The second input 50 is received from the occupant position tracking device 44. The third input 52 is data pertaining to the location of the relevant object in the vehicle environment 30 surrounding the vehicle 12. The system manager 46 is configured to determine (e.g., compute) the type, size, shape, and color of the AR-HUD graphics 40 to be displayed using the AR-HUD projector 42 based on the first input 48 (i.e., the vehicle location in the vehicle environment 30), the second input 50 (e.g., the position of the eyes 38b and/or head 38a of the occupant 38 in the vehicle 12), and the third input 52 (i.e. the location of the relevant object in the vehicle environment 30) The system manager 46 instructs an image engine 54, which is a software module or an integrated circuit of the AR-HUD projector 42 or the controller 14, to display the AR-HUD graphic 40 using the AR-HUD projector 42. The image engine 54 displays the AR-HUD graphic 40 on the windscreen 24 of the vehicle 12 using the AR-HUD projector 42 based on the type, size, shape, and color of the AR-HUD graphic 40 determined by the system manager 46. The AR-HUD graphic 40 is projected on the windscreen 24 by the AR-HUD projector 42 to show the AR-HUD graphic 40 along a roadway surface 56.

Figure 3:
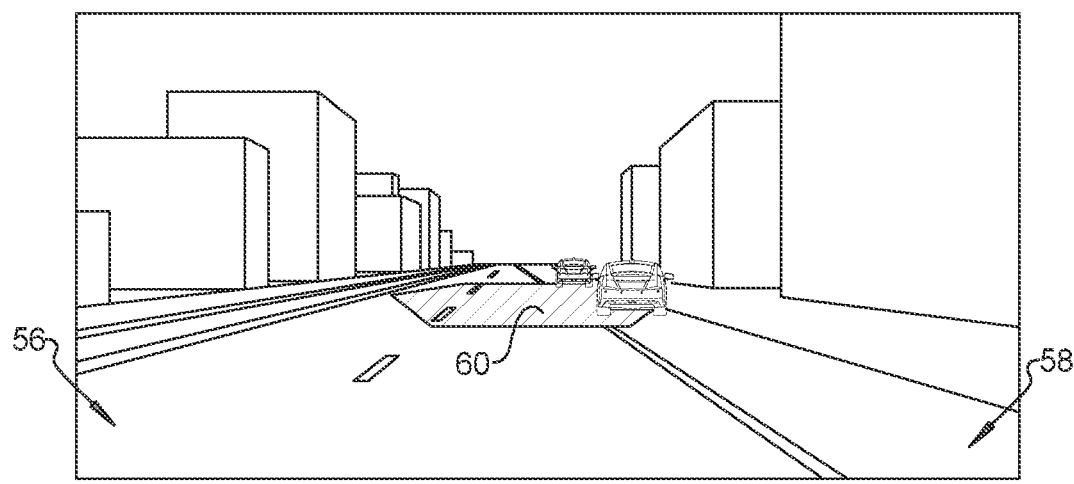
FIG. 3 is a schematic front view of a dual-focal plane augmented reality display, highlighting a second image plane of the dual-focal plane augmented reality display according to an exemplary embodiment.
Figure 4:
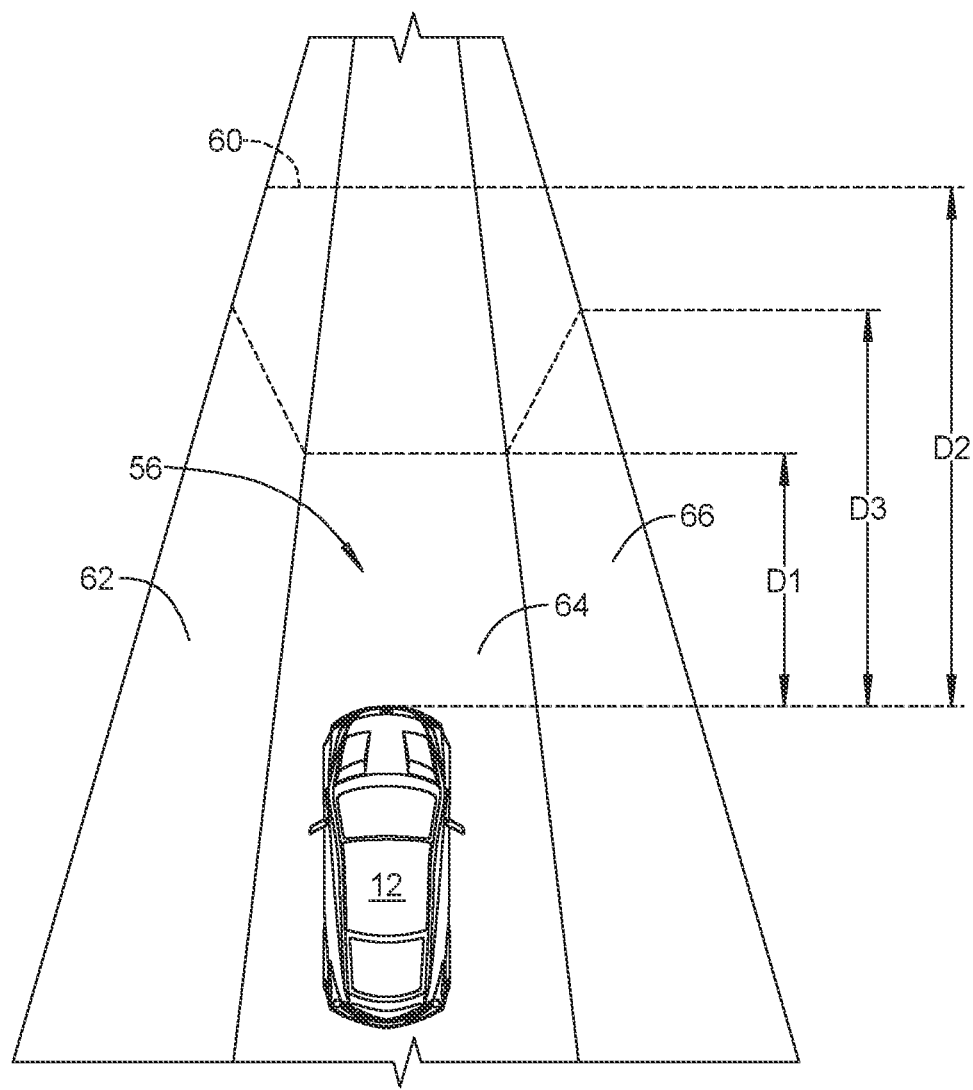
FIG. 4 is a schematic diagram of the second image plane of the dual-focal plane augmented according to an exemplary embodiment.

In the exemplary embodiment of the present disclosure, the AR-HUD system 18 is a dual-focal plane AR-HUD system. With reference to FIGS. 3 and 4 and with continued reference to FIG. 2, the AR-HUD system 18 has a first image plane 58 and a second image plane 60. The first image plane 58 shows the view of the outside world, and the second image plane 60 is reserved for displaying the AR-HUD graphics 40. The second image plane 60 spans multiple lanes and the AR-HUD graphics 40 appear at a location farther on a roadway surface 56 relative to the first image plane 58. For instance, as shown in FIGS. 3 and 4, the second image plane 60 covers a left lane 62, a central lane 64, and a right lane 66. As a non-limiting example, in the central lane 64, the second image plane 60 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the occupant 38 see the AR-HUD graphics 40 displayed using the AR-HUD projector 42. In the left lane 62 and the right lane 66, the second image plane 60 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the occupant 38 see the AR-HUD graphics 40 displayed using the AR-HUD projector 42. As used herein, the term "dual-focal plane AR-HUD" means an AR-HUD system that presents images in a first image plane and a second image plane, wherein the first image plane and the second image plane are at different locations. It is desirable to configure the AR-HUD system 18 as a dual-focal plane AR-HUD to facilitate manipulation of the AR-HUD graphics 40 on the view of the outside word. For instance, by using a dual-focal plane AR-HUD, the size, location, and characteristics of the AR-HUD graphics 40 may be changed based on, for example, the location of the eyes 38b of the occupant 38.

The TWD system 20 is used to display images on the windscreen 24 of the vehicle 12. In an exemplary embodiment, the AR-HUD system 18 can display the AR-HUD graphics 40 in a predefined region of the windscreen 24 (e.g., in the first image plane 58 and the second image plane 60). The TWD system 20 can display TWD graphics (not shown) in any region of the windscreen 24. Therefore, by operating the AR-HUD system 18 and the TWD system 20 in conjunction, the controller 14 may display graphics in any region of the windscreen 24. In an exemplary embodiment, the TWD system 20 includes transparent phosphors (not shown) embedded into the windscreen 24 and a TWD projector 68 (FIG. 1). The TWD system 20 is in electrical communication with the controller 14 as discussed above.

The transparent phosphors are light emitting particles which fluoresce in response to being excited by the TWD projector 68. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 68 is used to excite the transparent phosphors in a predetermined pattern to produce the TWD graphics on the windscreen 24. In an exemplary embodiment, the TWD projector 68 is a violet/ultraviolet laser projector disposed proximally to the headliner of the vehicle 12. The TWD projector 68 includes three lasers, each laser configured to excite one of the red, green, or blue transparent phosphors.

In an exemplary embodiment, the HMI 22 is used in addition to the AR-HUD system 18 and the TWD system 20 to display information about the location of the relevant object. In another exemplary embodiment, the HMI 22 is used instead of the AR-HUD system 18 and/or the TWD system 20 to display information about the location of the relevant object. In the aforementioned exemplary embodiments, the HMI 22 is a display system located in view of the occupant 38 and capable of displaying text, graphics, and/or images. It is to be understood that HMI display systems including LCD displays, LED displays, and the like are within the scope of the present disclosure. Further exemplary embodiments where the HMI 22 is disposed in a rearview mirror are also within the scope of the present disclosure. The HMI 22 is in electrical communication with the controller 14 as discussed above.

With reference again to FIG. 1, in an additional exemplary embodiment, the system 10 further includes a mobile device 70. The mobile device 70 is used to provide information to the occupant 38 when the occupant 38 is not in the vehicle 12. The mobile device 70 includes a mobile device controller 72, a mobile device display 74, a mobile device camera 76, and a mobile device communication system 78. Each of the mobile device display 74, the mobile device camera 76, and the mobile device communication system 78 are in electrical communication with the mobile device controller 72.

The mobile device controller 72 controls the operation of the mobile device 70. The mobile device controller 72 includes at least one processor 80 and a non-transitory computer readable storage device or media 82. In a non-limiting example, the processor 80 and media 82 of the mobile device controller 72 are similar in structure and/or function to the processor 26 and the media 28 of the controller 14, as described above.

The mobile device display 74 is used to display information to the occupant 38. The mobile device display 74 is capable of displaying text, graphics, and/or images. It is to be understood that the mobile device display 74 may include an LCD display, LED display, and/or the like without departing from the scope of the present disclosure.

The mobile device camera 76 is used to capture images of a mobile device environment 84 surrounding the mobile device 70. In the scope of the present disclosure, the mobile device environment 84 refers to the environment external to the mobile device 70 surrounding the mobile device 70. The mobile device environment 84 may or may not be the same as the vehicle environment 30 depending on a location of the mobile device 70 relative to the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The mobile device communication system 78 allows the mobile device controller 72 to communicate with remote systems. In an exemplary embodiment, the mobile device communication system 78 includes a wireless communication system configured to communicate using wireless networks such as a wireless local area network (WLAN) using IEEE 802.11 standards and/or using cellular data communication. Accordingly, in a non-limiting example, the mobile device communication system 78 includes one or more antennas and/or communication transceivers for transmitting and/or receiving signals.

Figure 5A:
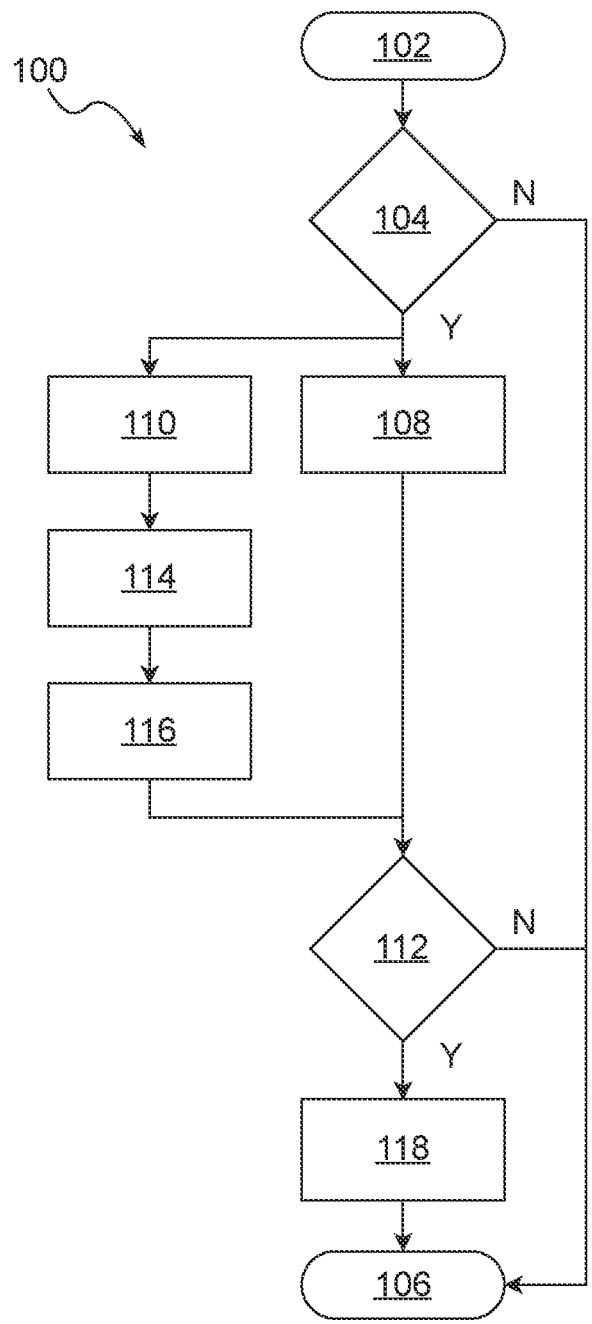
FIG. 5A is a flowchart of a method for displaying information about an environment surrounding a user according to an exemplary embodiment.

Referring to FIG. 5A, a flowchart of the method for displaying information about an environment surrounding a user is illustrated and generally indicated by reference numeral 100. The method 100 begins at block 102 and proceeds to block 104. At block 104, the controller 14 monitors the microphone 36 to receive a voice command from the occupant 38. In a non-limiting example, the controller 14 monitors the microphone 36 for electrical signals corresponding to human speech. If the voice command is not received, the method 100 proceeds to enter a standby state at block 106. If the voice command is received, the method 100 proceeds to blocks 108 and 110.

At block 108, the voice command received at block 104 is analyzed using a speech recognition algorithm to identify a phrase spoken by the occupant 38. The speech recognition algorithm is a methodology which translates spoken language into text, such that the controller 14 may take action based on the content of the spoken language. In an exemplary embodiment, the speech recognition algorithm is based on a statistical model, such as a hidden Markov model. In another exemplary embodiment, the speech recognition algorithm is based on a machine learning algorithm, such as a neural network. In a non-limiting example, the machine learning algorithm is trained by providing the algorithm with a plurality of sound samples which have been pre-classified as corresponding to specific voice commands. For example, the plurality of sound samples may include recordings of a plurality of individuals having different voice characteristics (e.g., pitch, speed, volume, and/or accent) speaking a plurality of words and/or phrases. After sufficient training of the machine learning algorithm, the algorithm can identify phrases spoken by the occupant 38 and received by microphone 36 with a high accuracy and precision. It should be understood that additional implementations of the speech recognition algorithm, including, for example, dynamic time warping based speech recognition, deep learning, and/or the like are included in the scope of the present disclosure.

The speech recognition algorithm is used to identify characteristics of a requested object. The requested object is an object in the vehicle environment 30 which the occupant 38 has requested information about. In an exemplary embodiment, the characteristics of the requested object include an identity and a color of the requested object. The speech recognition algorithm is used to determine the identity and color of the requested object based on the phrase spoken by the occupant 38. After block 108, the method 100 proceeds to block 112.

At block 110, the controller 14 uses the camera 32 to capture an image of the vehicle environment 30. After block 110, the method 100 proceeds to block 114.

At block 114, the controller 14 determines an identity of objects in the image captured at block 110 using an object detection algorithm. The object detection algorithm is a methodology which allows for detecting and identifying objects in images and/or videos. In an exemplary embodiment, the object detection algorithm is a machine learning algorithm, such as a neural network, which has been trained to detect and identify objects in a similar manner as discussed above. In the scope of the present disclosure, objects detected at block 114 are referred to as detected objects. It should be understood that additional methodologies for detecting and identifying objects in images and/or videos are also within the scope of the present disclosure. After block 114, the method 100 proceeds to block 116.

At block 116, a color of each detected object identified at block 114 is determined using an image segmentation algorithm. The purpose of the image segmentation algorithm is to reduce the number of unique colors in the image, allowing for a more efficient determination of the color of each detected object in the image. The image segmentation algorithm is a methodology to partition an image and/or video into a plurality of image segments, based on, for example, color. Accordingly, pixels in each detected object of the image having similar colors are grouped together, becoming an image segment. After the image segmentation algorithm is performed, each detected object comprises at least one image segment having a solid color. In an exemplary embodiment, the color of each detected object is determined by counting a number of pixels of each color in each detected object. For each detected object, the color having the highest number of pixels is determined to be the color of the detected object. It should be understood that additional methods of determining the color of each detected object based on the segmented image are within the scope of the present disclosure. After block 116, the method 100 proceeds to block 112.

At block 112, the location of the relevant object in the vehicle environment 30 is located based on the identity and color of the requested object determined from the phrase spoken by the occupant 38 at block 108 and the identity and color of each detected object determined at blocks 114 and 116. The controller 14 attempts to locate a detected object in the image having an identity and a color which is substantially similar to the identity and the color of the requested object. In the scope of the present disclosure, substantially similar means that the compared items would be considered to be equivalent or interchangeable by a reasonable person. For example, if the identity of the requested object is an awning, substantially similar identities include words which are synonymous with meaning of the word awning, such as, for example, canopy. In another example, if the color of the requested object is magenta, substantially similar colors include colors which appear similar, such as, for example, pink. In the scope of the present disclosure, a detected object having an identity and a color substantially similar to the identity and color of the requested object is referred to as the relevant object. If no relevant objects are identified, the method 100 proceeds to enter the standby state at block 106. In an exemplary embodiment, if multiple relevant objects are identified, one of the relevant objects may be chosen for use in the following method steps. In a non-limiting example, the closest relevant object to the vehicle 12 is chosen using the vehicle sensors 16, for example, using the camera 32 in conjunction with a machine learning algorithm to identify a distance between the vehicle 12 and each of the relevant objects. In another exemplary embodiment, if multiple relevant objects are identified, all of the relevant objects are used in the following method steps. If at least one relevant object is identified, the method 100 proceeds to block 118.

In an additional embodiment, instead of performing blocks 110, 114, and 116 and 112 of the method 100, controller 14 uses the vehicle communication system 34 to establish a connection with a remote system, for example, a pole-mounted traffic camera. The controller 14 transmits the identity and the color of the requested object to the remote system using the vehicle communication system 34. The remote system, for example, the pole-mounted traffic camera, identifies at least one relevant object in the vehicle environment 30, and transmits a location of the at least one relevant object to the vehicle communication system 34 for use in the following method steps.

At block 118, a graphic indicating the location and color of the relevant object in field-of-view of the occupant 38 is displayed using at least one of the AR-HUD system 18, the TWD system 20, and the HMI 22, as discussed above in reference to FIGS. 2, 3, and 4. In an exemplary embodiment, the graphic is displayed using the AR-HUD system 18 and the TWD system 20, and the HMI 22 is used to display the graphic if the AR-HUD system 18 and/or the TWD system 20 are unavailable and/or non-functional. Examples of the graphic displayed at block 118 will be discussed in greater detail below. In an alternate exemplary embodiment, at block 118, the controller 14 uses a loudspeaker (not shown) of the vehicle 12 to provide audible feedback to the occupant 38. In a non-limiting example, the audible feedback includes a computer-generated voice configured to speak to the occupant 38. It should be understood that the audible feedback may be provided either in conjunction with visual feedback (i.e., using the AR-HUD system 18, TWD system 20, and/or HMI 22) or without the visual feedback within the scope of the present disclosure. After block 118, the method 100 proceeds to enter the standby state at block 106.

In an exemplary embodiment, the controller 14 may repeatedly exit the standby state 106 and restart the method 100 at block 102. In a non-limiting example, the controller 14 may exit the standby state 106 and restart the method 100 on a timer, for example, every three hundred milliseconds. By repeatedly performing the method 100, the graphic displayed at block 118 is updated to account for motion of the vehicle 12.

In an additional embodiment, block 108 of the method 100 includes a transmission to the mobile device 70. In the aforementioned additional embodiment, after determining the identity and the color of the requested object at block 108, the identity and color of the requested object are transmitted to the mobile device 70 using the vehicle communication system 34. It should be understood that various methods of transmitting the identity and color of the requested object to the mobile device 70, including transmitting the identity and color of the requested object using an intermediate system, such as network server, are within the scope of the present disclosure.

Figure 5B:
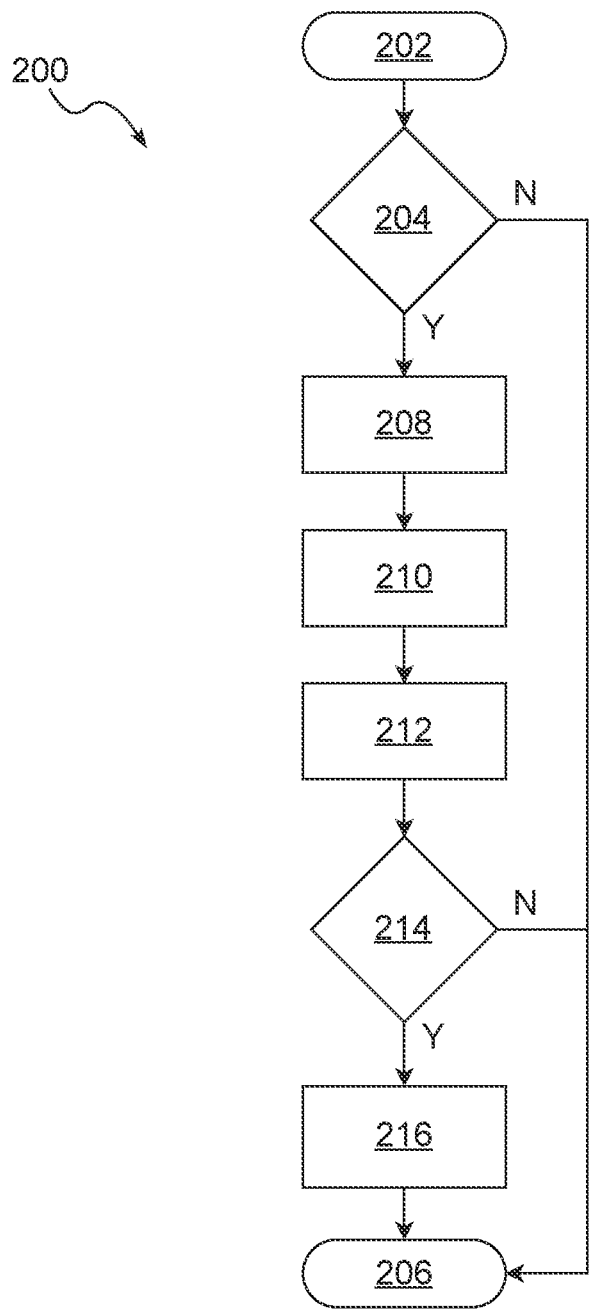
FIG. 5B is a flowchart of a method for displaying information about an environment surrounding a user using a mobile device according to an exemplary embodiment.

Referring to FIG. 5B, a flowchart of a method for displaying information about an environment surrounding the user using the mobile device 70 is illustrated and generally indicated by reference numeral 200. The method 200 begins at block 202 and proceeds to block 204. At block 204, the mobile device controller 72 monitors the mobile device communication system 78 to determine if a transmission has been received from the vehicle communication system 34. If a transmission is not received from the vehicle communication system 34, the method 200 proceeds to enter a standby state at block 206. If a transmission is received from the vehicle communication system 34, the method 200 proceeds to block 208.

At block 208, the mobile device controller 72 uses the mobile device camera 76 to capture an image of the mobile device environment 84. After block 208, the method 200 proceeds to block 210.

At block 210, the mobile device controller 72 determines the identity of objects in the image captured at block 208 using the object detection algorithm as discussed above in reference to block 114. Accordingly, a plurality of detected objects are identified in the image captured at block 208. After block 210, the method 200 proceeds to block 212.

At block 212, a color of each detected object identified at block 210 is determined using the image segmentation algorithm as discussed above in reference to block 116. Accordingly, the identity and color of each detected object identified at block 210 is determined. After block 212, the method 200 proceeds to block 214.

At block 214, a relevant object in the mobile device environment 84 is located based on the identity and color of the requested object received from the vehicle communication system 34 at block 204 and the identity and color of each detected object determined at blocks 210 and 212. The relevant object in the mobile device environment 84 is located as discussed above in reference to block 112. If no relevant object is located in the mobile device environment 84, the method 200 proceeds to enter the standby state at block 206. If at least one relevant object is located in the mobile device environment 84, the method 200 proceeds to block 216.

At block 216, an augmented reality graphic is displayed using the mobile device display 74. The mobile device controller 72 displays a live video from the mobile device camera 76 of the mobile device environment 84 and overlays the graphic on the relevant object in the mobile device environment 84. Examples of the graphic will be discussed in more detail below.

Figure 6A:
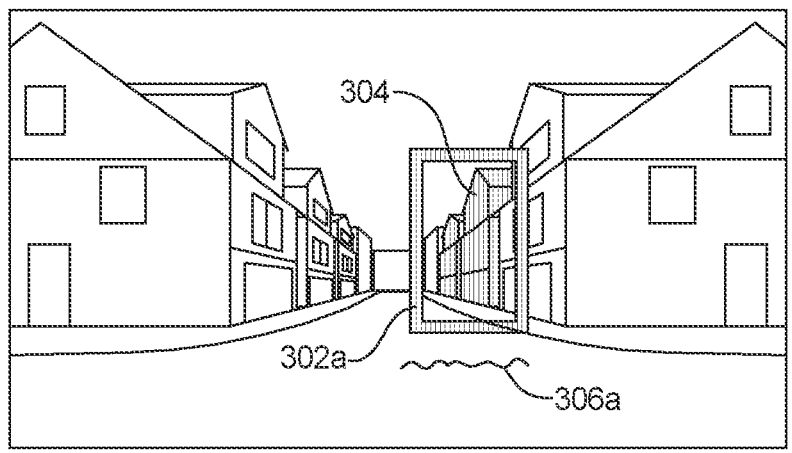
FIG. 6A is a first exemplary graphic shown overlayed on a first exemplary requested object according to an exemplary embodiment.

Referring to FIG. 6A, a first exemplary graphic 302a is shown overlayed on a first exemplary requested object 304. The first exemplary requested object 304 is a red building. The first exemplary graphic 302a is a rectangle (i.e., a polygon) overlayed on the first exemplary requested object 304 in the field-of-view of the user. Proximal to the first exemplary graphic 302a is a first exemplary text 306a. In an exemplary embodiment, the first exemplary text indicates the color of the first exemplary requested object 304 (e.g., "RED"). Accordingly, the system 10 and methods 100 and/or 200 are used to assist a color-vision impaired user in locating the red building while driving the vehicle 12 or using the mobile device 70, thus assisting the user in arriving at an intended destination.

Figure 6B:
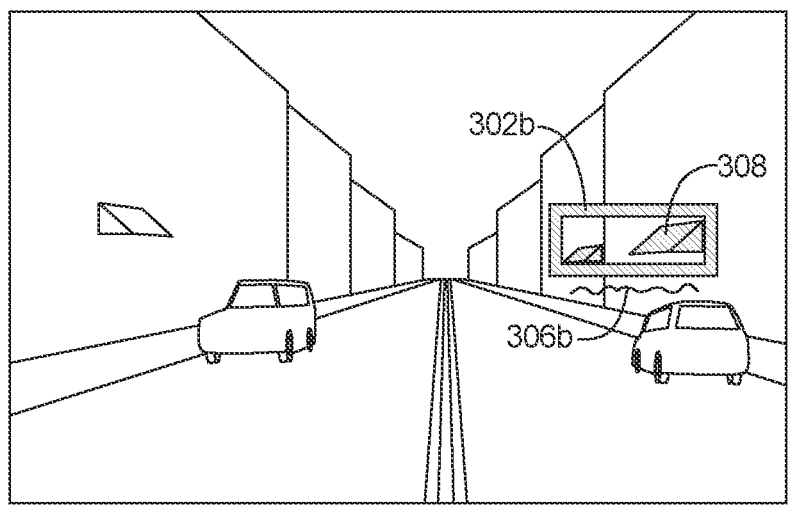
FIG. 6B is a second exemplary graphic shown overlayed on a second exemplary requested object according to an exemplary embodiment.

Referring to FIG. 6B, a second exemplary graphic 302b is shown overlayed on a second exemplary requested object 308. The second exemplary requested object 308 is a green awning. The second exemplary graphic 302b is a rectangle (i.e., a polygon) overlayed on the second exemplary requested object 308 in the field-of-view of the user. Proximal to the second exemplary graphic 302b is a second exemplary text 306b. In an exemplary embodiment, the second exemplary text indicates the color of the second exemplary requested object 308 (e.g., "GREEN"). Accordingly, the system 10 and methods 100 and/or 200 are used to assist a color-vision impaired user in locating the green awning while driving the vehicle 12 or using the mobile device 70, thus assisting the user in arriving at an intended destination.

Figure 6C:
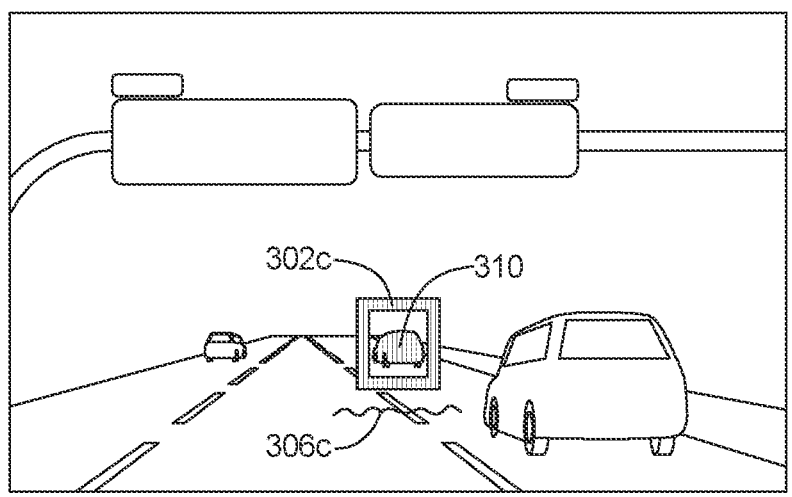
FIG. 6C is a third exemplary graphic shown overlayed on a third exemplary requested object according to an exemplary embodiment.

Referring to FIG. 6C, a third exemplary graphic 302c is shown overlayed on a third exemplary requested object 310. The third exemplary requested object 310 is a red vehicle. The third exemplary graphic 302c is a rectangle (i.e., a polygon) overlayed on the third exemplary requested object 310 in the field-of-view of the user. Proximal to the third exemplary graphic 302c is a third exemplary text 306c. In an exemplary embodiment, the third exemplary text indicates the color of the third exemplary requested object 310 (e.g., "RED"). Accordingly, the system 10 and methods 100 and/or 200 are used to assist a color-vision impaired user in locating the red vehicle while driving the vehicle 12 or using the mobile device 70.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for displaying information to an occupant of a vehicle, the system comprising:
   a vehicle microphone for converting acoustic waves to electrical signals;
   a vehicle camera for capturing images of an environment surrounding the vehicle;
   a display for displaying information to the occupant;
   a vehicle communication system;
   a mobile device; and
   a vehicle controller in electrical communication with the vehicle microphone, the vehicle camera, and the vehicle communication system, wherein the vehicle controller is programmed to:
      receive a voice command from the occupant using the vehicle microphone, wherein the voice command relates to a requested object;
      determine an identity and a color of the requested object based on the voice command;
      transmit the identity and the color of the requested object to the mobile device using the vehicle communication system;
      capture a first image of the environment using the vehicle camera, wherein the environment includes a relevant object;
      capture a second image of the environment surrounding the occupant using a mobile device camera of the mobile device;
      identify a location of the relevant object in the environment based at least in part on the first image, the second image, and the identity and the color of the requested object; and
      display a graphic indicating the location of the relevant object in the environment using the display, wherein the display includes at least one of: a vehicle display and a mobile device display of the mobile device.

2. The system of claim 1, wherein to receive the voice command from the occupant using the vehicle microphone, the vehicle controller is further programmed to:
   receive a plurality of electrical signals corresponding to acoustic waves detected by the vehicle microphone; and
   identify a phrase spoken by the occupant using the plurality of electrical signals and a speech recognition algorithm.

3. The system of claim 2, wherein to determine the identity and the color of the requested object, the vehicle controller is further programmed to:
   determine the identity of the requested object and the color of the requested object by analyzing the phrase spoken by the occupant.

4. The system of claim 3, wherein identifying the location of a relevant object in the environment, the vehicle controller is further programmed to:
   analyze the image of the environment to locate the relevant object, wherein an identity of the relevant object is substantially similar to the identity of the requested object, and a color of the relevant object is substantially similar to the color of the requested object.

5. The system of claim 4, wherein to analyze the image of the environment to locate the relevant object, the vehicle controller is further programmed to:
   determine an identity and a location for each of a plurality of detected objects in the image using an object detection algorithm;
   determine a color for each of the plurality of detected objects in the image using an image segmentation algorithm; and
   locate the relevant object in the image based at least in part on the identity, location, and color of each of the plurality of detected objects in the image and based at least in part on the identity of the requested object and the color of the requested object.

6. The system of claim 5, wherein to locate the relevant object based at least in part on the identity, location, and color of the plurality of detected objects in the image and based at least in part on the identity of the requested object and the color of the requested object, the vehicle controller is further programmed to:
   identify a plurality of matching objects in the image, wherein the plurality of matching objects is a subset of the plurality of detected objects, and wherein the identity of each of the plurality of matching objects is substantially similar to the identity of the requested object and the color of each of the plurality of matching objects is substantially similar to the color of the requested object; and
   determine a distance between the vehicle and each of the plurality of matching objects; and
   identify the relevant object as a closest matching object of the plurality of matching objects to the vehicle based on the distance between the vehicle and each of the plurality of matching objects; and
   locate the relevant object based on the location of each of the plurality of detected objects in the image.

7. The system of claim 3, wherein to transmit the identity and the color of the requested object to the mobile device, the vehicle controller is further programmed to:

establish a connection with the mobile device using the vehicle communication system;

transmit the identity and the color of the requested object to the mobile device using the vehicle communication system; and receive the location of the relevant object in the environment from the mobile device using the vehicle communication system, wherein an identity of the relevant object is substantially similar to the identity of the requested object, and a color of the relevant object is substantially similar to the color of the requested object.

8. The system of claim 1, wherein the vehicle display is an augmented reality head-up display (AR-HUD) system in electronic communication with the vehicle controller, wherein the AR-HUD system includes an occupant position tracking device and an AR-HUD projector, and wherein to display the graphic the vehicle controller is further programmed to:

determine a position of an occupant of the vehicle using the occupant position tracking device;

calculate a size, shape, and location of the graphic based on the position of the occupant and the image of the environment; and display the graphic indicating the location of the relevant object on a windscreen of the vehicle using the AR-HUD system based on the size, shape, and location of the graphic.

9. The system of claim 8, wherein the display further includes a transparent windscreen display (TWD) system in electronic communication with the vehicle controller, wherein the TWD system includes transparent phosphors embedded in the windscreen of the vehicle and a TWD projector, and wherein to display the graphic the vehicle controller is further programmed to:

calculate a size, shape, and location of the graphic based on the image of the environment; and display the graphic indicating the location of the relevant object on the windscreen of the vehicle using the TWD system based on the size, shape, and location of the graphic.

10. The system of claim 9, wherein the graphic includes a polygon overlayed on the relevant object and text displayed proximal to the polygon, wherein the polygon identifies the location of the relevant object, and the text identifies the color of the relevant object.

11. A method for displaying information about an environment surrounding a user, the method comprising:

receiving a voice command from the user relating to a requested object using a vehicle controller;

determining an identity and a color of the requested object using the vehicle controller based at least in part on the voice command;

transmitting the identity and the color of the requested object to a mobile device using the vehicle controller and a vehicle communication system;

capturing a first image of the environment surrounding the user using a vehicle camera, wherein the vehicle camera is in electrical communication with the vehicle controller;

capturing a second image of the environment surrounding the user using a mobile device camera, wherein the mobile device camera is in communication with the vehicle controller via the vehicle communication system;

identifying a relevant object in the environment surrounding the user using the vehicle controller based on the first image, the second image, the identity of the requested object, and the color of the requested object; and displaying a graphic indicating a location of the relevant object in the environment surrounding the user using a display, wherein the display includes at least one of: a vehicle display and a mobile device display of the mobile device.

12. The method of claim 11, wherein receiving the voice command relating to the requested object from the user further comprises:

prompting the user to provide the voice command relating to the requested object.

13. The method of claim 12, wherein determining the identity and the color of the requested object further comprises:

receiving a user input using a human-machine interface (HMI), wherein the HMI is in electrical communication with the vehicle controller; and determining the identity and the color of the requested object based at least in part on the user input.

14. The method of claim 12, wherein receiving the voice command relating to the requested object further comprises:

receiving the voice command using a microphone in electrical communication with the vehicle controller, wherein the voice command is a voice of the user, and wherein the microphone is configured to convert acoustic waves corresponding to the voice of the user to electrical signals;

processing the electrical signals corresponding to the voice of the user to identify a phrase spoken by the user using a speech recognition algorithm; and determining the identity and the color of the requested object based on the phrase spoken by the user.

15. The method of claim 11, wherein identifying the relevant object in the environment surrounding the user further comprises:

analyzing the first image and the second image of the environment to identify a plurality of detected objects in the environment using an object detection algorithm;

identifying at least one matching objects, wherein the at least one matching objects are a subset of the plurality of detected objects, and wherein the identity of each of the at least one matching objects is substantially similar to the identity of the requested object, and the color of each of the at least one matching objects is substantially similar to the color of the requested object; and identifying the relevant object to be the closest of the at least one matching objects to the user.

16. The method of claim 11, wherein displaying the graphic indicating the location of the relevant object in the environment surrounding the user further comprises:

capturing a third image of the environment including the relevant object;

overlaying the graphic on relevant object in the third image of the environment; and displaying the third image of the environment including the graphic overlayed on the relevant object to the user.

17. The method of claim 11, wherein displaying the graphic indicating the location of the relevant object in the environment surrounding the user further comprises:

displaying the graphic using an augmented reality head-up display (AR-HUD), wherein the graphic appears overlayed on the relevant object.

18. A system for displaying information to a user of a vehicle, the system comprising:

a vehicle microphone for converting acoustic waves to electrical signals;
a vehicle camera for capturing images of an environment surrounding the vehicle;
a vehicle display for displaying information to the user;
a vehicle communication system;
a mobile device, wherein the mobile device includes a mobile device camera, a mobile device display, and a mobile device controller in electrical communication with the mobile device camera and the mobile device display; and
a vehicle controller in electrical communication with the vehicle microphone, the vehicle camera, the vehicle display, and the vehicle communication system, wherein the vehicle controller is programmed to:
receive a voice command from the user using the vehicle microphone, wherein the voice command relates to a requested object;
determine an identity and a color of the requested object based on the voice command;
transmit the identity and the color of the requested object to the mobile device using the vehicle communication system;
capture a first image of the environment surrounding the vehicle using the vehicle camera, wherein the environment surrounding the vehicle includes a relevant object;
identify a location of the relevant object in the environment surrounding the vehicle based at least in part on the first image and the identity and the color of the requested object; and
display a graphic indicating the location of the relevant object in the environment surrounding the vehicle using the vehicle display; and
wherein the mobile device controller is programmed to:
receive the identity and color of the requested object transmitted by the vehicle communication system;
capture a second image of an environment surrounding the mobile device using the mobile device camera, wherein the environment surrounding the mobile device includes the relevant object;
identify the location of the relevant object in the environment surrounding the mobile device based at least in part on the second image and the identity and the color of the requested object; and
display a graphic indicating the location of the relevant object in the environment surrounding the mobile device using the mobile device display.

19. The system of claim 18, wherein to identify the location of the relevant object in the environment surrounding the vehicle, the vehicle controller is further programmed to:
determine an identity and a location for each of a plurality of detected objects in the first image using an object detection algorithm;
determine a color for each of the plurality of detected objects in the first image using an image segmentation algorithm; and
locate the relevant object in the first image based at least in part on the identity, location, and color of each of the plurality of detected objects in the first image and based at least in part on the identity of the requested object and the color of the requested object.

20. The system of claim 19, wherein to identify the location of the relevant object in the environment surrounding the mobile device, the mobile device controller is further programmed to:
determine an identity and a location for each of a plurality of detected objects in the second image using the object detection algorithm;
determine a color for each of the plurality of detected objects in the second image using the image segmentation algorithm; and
locate the relevant object in the second image based at least in part on the identity, location, and color of each of the plurality of detected objects in the second image and based at least in part on the identity of the requested object and the color of the requested object.

* * * * *